Dec. 5, 1967 A. W. PRZYBYSZEWSKI 3,356,969

WAVE-SIGNAL TRANSLATING APPARATUS

Filed Nov. 14, 1962

INVENTOR.
Adam W. Przybyszewski
BY
Francis W. Crotty
Atty.

3,356,969
Patented Dec. 5, 1967

3,356,969

WAVE-SIGNAL TRANSLATING APPARATUS

Adam W. Przybyszewski, Niles, Ill., assignor to Zenith Radio Corporation, Chicago, Ill., a corporation of Delaware Filed Nov. 14, 1962, Ser. No. 237,615
5 Claims. (Cl. 333—76)

Figures 1, 2:
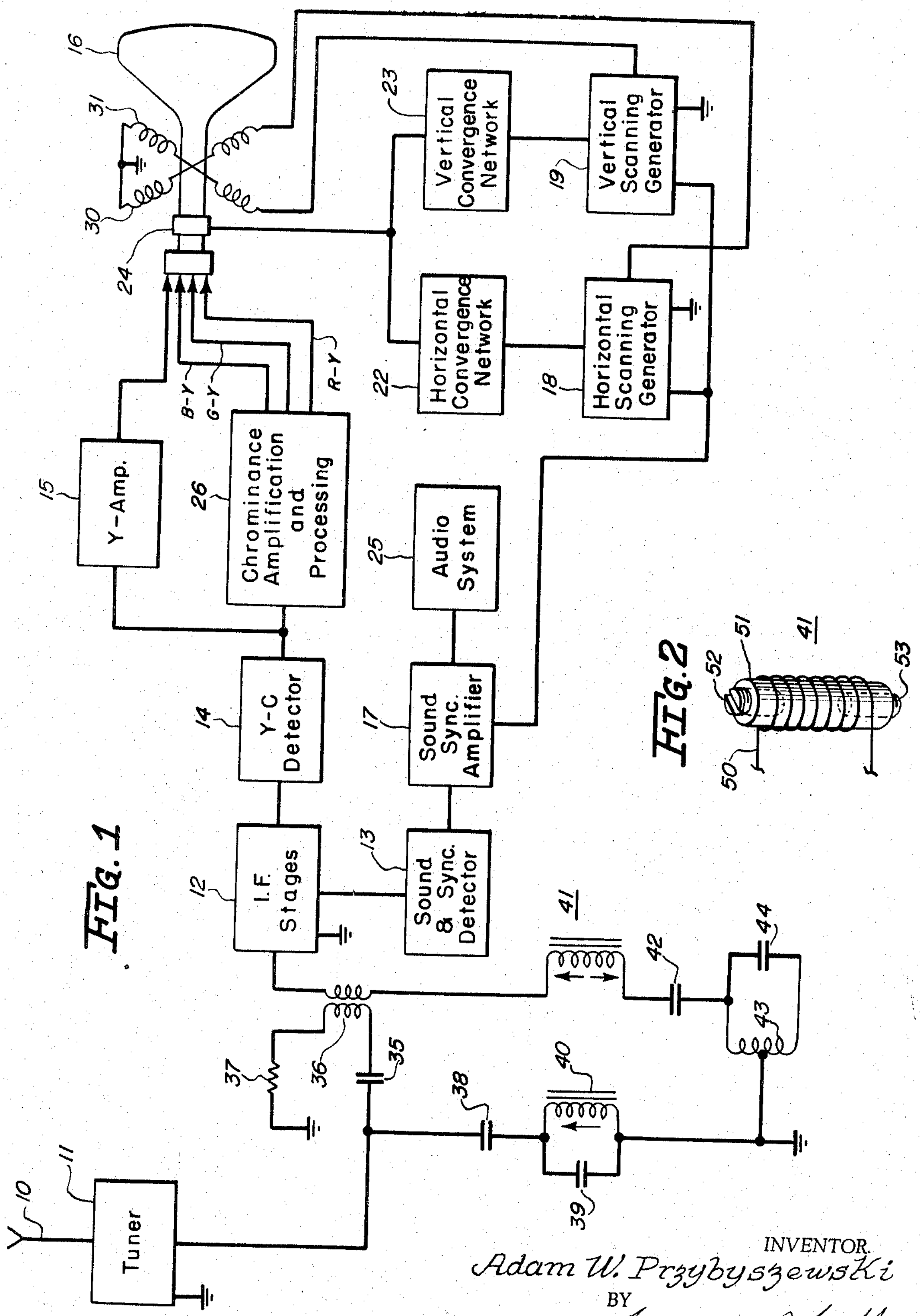

The present invention relates to signal attenuating circuits and, more specifically, to a variable inductor for use in a signal attenuating circuit of a television receiver.

In conventional monochrome and color television receivers, the intermediate frequencies associated with a selected received signal which are of importance are the sound signal at the intermediate-frequency of 41.25 megacycles, the video signal at 45.75 megacycles, the sound signal component of the lower adjacent channel at 47.25 megacycles and the video signal of the next higher adjacent channel at 39.75 megacycles. Additionally, in a color receiver the chrominance information is modulated on an intermediate-frequency carrier having a frequency of 42.17 megacycles. These frequencies are recommended by the Radio, Electronics and Television Manufacturers Association in the interest of uniformity.

To prevent intermodulation and interference between the previously mentioned intermediate-frequency signals, it is necessary to provide adequate rejection of the sound carriers of both the selected television signal and the adjacent channel signal and to maintain the video carrier of the selected signal at a uniform level. Of particular concern is rejection of the adjacent sound carrier. Various methods of dealing with the problem have been directed to the utilization of one or more traps comprised of parallel- or series-tuned circuits, such circuits being tuned to the particular sound carrier it is desired to reject. A limiting factor, however, in any trap is the inherent resistance of its electrical components. This resistance tends to lower the Q of the tuned circuit and reduce the sharpness or selectivity of the circuit response; no practical means has heretofore been provided for controlling the response characteristic of the trap circuit without adversely affecting the Q of the circuit.

It is, therefore, an object of this invention to provide a new and improved signal translating coupling network which overcomes the aforenoted deficiencies and difficulties of conventional trap circuits.

It is another object of this invention to provide a new and improved trap circuit which has both variable Q and a variable trap frequency.

It is a further object of this invention to provide a variable inductor for use in a trap circuit which is characterized by both variable Q and variable inductance.

It is a further object to achieve these desirable objectives with a minimum expenditure of cost and components.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIGURE 1 is a simplified electrical schematic block diagram of a color television receiver incorporating the invention; and FIGURE 2 is a perspective view of a preferred form of an inductor embodying the invention.

In accordance with the invention an adjustable wave signal trap network for attenuating a wave signal of predetermined frequency comprises a capacitor device and an inductance coil which is coupled to the capacitor to resonate therewith and to constitute a trap for signals of the aforesaid predetermined frequency. Means including a first tuning member is supported in coaxial alignment with and is movable longitudinally of the coil for effecting substantially equal proportional variations in the inductance and the equivalent resistance of the coil in order to maintain the Q of the coil substantially constant with changes in coupling between the tuning member and the field of the coil. As a result the Q of the coil remains substantially independent of the adjustment of the tuning member. Further means are provided including a second tuning member which is also supported in coaxial alignment with and movable longitudinally of the coil and independently of the first member. The second tuning member predominantly effects variations in the Q of the coil with changes in the coupling between itself and the field of the coil.

In the color television receiver shown in FIGURE 1, an antenna 10 is connected to the input circuit of a tuner 11 which comprises one or more stages of radio-frequency amplification and a converter or first detector. Coupled to tuner 11, in a manner to be discussed subsequently in more detail, is an intermediate-frequency (IF) amplifier 12 of any desired number of stages having a pair of outputs connected to a pair of detectors 13 and 14, one for deriving the sound signal components and the other for deriving the brightness (Y) and the chrominance (C) signal components. The sound detector 13 is also used to derive synchronizing (sync) information as is conventional; however, it is known to utilize either detector for obtaining synchronizing information. One output circuit of detector 14 is coupled to a Y amplifier 15 of any desired number of stages which drives the cathodes of each of the three electron guns of a conventional three-beam tricolor kinescope 16.

The sound and sync signal output of sound detector 13 connects to a sound-sync amplifier 17 of one or more stages which includes a synchronizing signal separator. A sync signal output of amplifier 17 drives both a horizontal scanning signal generator 18 and a vertical scanning signal generator 19. Horizontal scanning generator 18 includes a line frequency oscillator, a phase detector and a frequency control stage for providing automatic gain control of the oscillator frequency. Vertical scanning generator 19 employs a field scanning signal developer or driver and one or more stages of amplification. Scanning signal generators 18 and 19 are coupled to respective line frequency and field frequency magnetic deflection elements 30 and 31.

Energy derived from horizontal scanning generator 18 and from vertical scanning generator 19 is fed respectively to a horizontal convergence network 22 and a vertical convergence network 23. The vertical convergence network 23 develops appropriate dynamic convergence signals which are applied to a convergence yoke 24 associated with tricolor kinescope 16 while horizontal convergence network 22 develops similar signals which are also applied to yoke 24.

An automatic gain control system may be included within unit 17 to develop an AGC potential for application to tuner 11 or IF amplifier 12 as is well understood in the art. An intercarrier sound signal derived from a sound-signal output circuit of amplifier 17 is applied to a conventional audio system 25 which comprises a limiter, a discriminator, an audio amplifier of any desired number of stages, a loudspeaker or other sound reproducing device.

In order to translate the color information of a received telecast, the output circuit of Y-C detector 14 connects through suitable chrominance, amplification and processing circuits 26 which are of entirely conventional construction. Typically, these circuits include one or more stages of chorminance amplification, a color burst amplifier and separator, a color reference oscillator with an associated automatic frequency control circuit, a color killer and a pair of synchronous demodulators for developing three color difference signals R-Y, G-Y and B-Y corresponding to the chrominance information associated with the three primary colors, red, green and blue. The several outputs of network 26 at which the color difference signals are available connect respectively to the control grids of the three electron guns of kinescope 16. If desired, chrominance amplification and processing circuits 26 may also comprise appropriate automatic chrominance control circuits and, of course, appropriate controls for adjusting hue and saturation of the reproduced image.

As thus described, the receiver is entirely conventional so that only a brief description of its operation need be recited here. The receiver color telecast intercepted by antenna 10 is selected by appropriate adjustment of a tuner 11 where it is amplified and converted to an intermediate-frequency signal which is amplified in amplifier 12. The intermediate-frequency signal is then applied to Y-C detector 14 and to sound and sync detector 13. The luminance output of detector 14 is applied to Y amplifier 15 and thence to the cathodes of picture tube 16. Furthermore, Y-C detector 14 supplies an output signal to chrominance amplification and processing network 26 which develops the chrominance signal information for concurrent application to the three electron guns of tube 16.

The output signal from sound and sync detector 13 concurrently drives audio system 25 in known fashion to reproduce the audio program accompanying the telecast and concurrently controls the horizontal and vertical sweep circuits 18 and 19. Accordingly, appropriate synchronized scanning signals are developed and applied to yokes 30 and 31 of picture tube 16 to deflect the electron beams thereof across the target electrode as required to develop an image raster thereupon. Since the electron beams are suitably modulated by luminance information from amplifier 15 and by chrominance information from network 26, their traverse across the screen under the influence of the deflection fields of the yokes results in the reproduction of a visual image. The reproduction is that of three image fields effectively superposed to yield an image in simulated natural color.

More consideration will now be given to the construction of the signal translating trap networks which translate the signal from tuner 11 to IF amplifier 12. A direct current blocking capacitor 35 prevents any direct current signals present in tuner 11 from reaching a ground plane but does, however, pass the intermediate-frequency alternating current composite color signals developed by tuner 11. One terminal of capacitor 35 connects to tuner 11 while the remaining terminal thereof is coupled to one end of the primary winding of a transformer 36 constructed of a tuned transmission line which is the subject of a patent to P. H. Van Anrooy, 2,934,722 assigned to the same assignee as the present invention. The remaining end of the primary is coupled to ground through an equalizing impedance 37 which approximately matches the impedance of the primary side of the transmission line transformer to the secondary side, including the stages following the transformer but which reflect impedance thereon. The composite color signals developed in tuner 11 are also applied to a 39.75 megacycle signal trap circuit, which is tuned to the video frequency of the higher channel adjacent the selected signal. This trap comprises the series arrangement of a capacitor 38 and a tank circuit consisting of an inductor 40 and a capacitor 39 coupled between the output of tuner 11 and ground.

The secondary winding of transformer 36 has one end connected to IF stage 12 and its remaining end connected to a variable indicator 41. The series arrangement of inductor 41, a capacitor 42 and a tank circuit comprising a capacitor 44 and an inductor 43 center tapped to ground, form two trap circuits. Inductor 41 and capacitor 42 comprise a 47.25 megacycle trap circuit, which is tuned to attenuate the sound signal component of the next lower channel, while the series arrangement of the capacitor 42 and the tank circuit consisting of inductor 43 and capacitor 44 serve to attenuate to a predetermined level the 41.25 megacycle sound signal which is associated with the channel selected by tuner 11. However, as is well known, the reactive elements of the 41.25 megacycle and 47.25 megacycle trap circuits interact and each circuit contributes some reactive components to the other.

In accordance with the invention inductor 41, as shown in FIGURE 2, comprises a winding 50 which is wound about a coil form 51. Coil form 51 is suitably threaded to accept threaded tuning members or cores 52 and 53 which are supported in coaxial alignment with and movable longitudinally of the coil. Cores 52 and 53 move independently of one another. Core 52 is constructed of a material having given power or core loss properties while core 53 is constructed of a material having different loss properties. Core 52 is formed of a material which effects substantially proportional or, more specifically, approximately equal variations in the inductance and resistance of the coil with changes in coupling between the core and the field of the coil. Core 53, on the other hand, is formed of a material which effects variations in the inductance of the coil with change in coupling of it with the field of the coil. Generally, the Q of a coil is expressed as:

$$Q=\frac{\omega L}{R}$$

Obviously, if the ratio of inductance L to equivalent resistance R remains approximately constant, the Q of the device remains unchanged at a given frequency, however, its inductance may vary. Core 52 is constructed such that the proportional requirements are met and provides adjustment of the inductance value of inductor 41 without variations in its Q. Core 53 has higher loss properties than core 52 and the inductance to equivalent resistance ratio no longer remains proportional with adjustment of this core thus making an appreciable change in the Q value of the coil. Obviously, as the Q of the inductor is varied, its inductance is changed so that core 52 must be repositioned after an adjustment of core 53 to insure that the circuit attenuates the desired frequency.

In operation, the composite color signal developed by tuner 11 comprises components at 39.75 megacycles, 41.25 megacycles and 47.25 megacycles as well as other video and color signal components. The 39.75 megacycle adjacent video component signal is effectively attenuated by the trap circuit comprising elements 38, 39 and 40, the latter element providing a degree of adjustment to compensate for component variations. The 41.25 megacycle sound signal associated with the selected channel is appropriately attenuated by the desired amount by the tank circuit comprising inductor 43 and capacitor 44 while the 47.25 megacycle sound signal of the adjacent lower channel is attenuated by means of the series circuit comprising inductor 41 and capacitor 42. Core 52 is moved until the series circuit 41, 42 is tuned to attenuate the 47.25 megacycle signal. After core 52 is initially positioned, core 53 is positioned with respect to the coil so that the Q of the circuit is effectively varied to provide complete attenuation or nulling out of the 47.25 megacycle signal. Because the inductance of the coil is changed due to the positioning of core 53, core 52 must be readjusted to insure that the attenuation is at the 47.25 megacycle signal. This repositioning does not appreciably affect the Q of the circuit for the reasons previously explained.

Merely by way of illustration and in no sense by way of limitation, the following component values were employed in one operative embodiment of the arrangement shown in the figures:

| | | |
|---|---|---|
| Resistor **37** | ohms | 12,000 |
| Direct current resistance of coil **50** | do | .1 |
| Capacitor **35** | micromicrofarads | 470 |
| Capacitor **38** | do | 19 |
| Capacitor **39** | do | 45 |
| Capacitor **42** | do | 16 |
| Capacitor **44** | do | 56 |
| Center value of inductor **40** | microhenry | .30 |
| Center value of inductor **43** | do | .35 |
| Center value of indicator 41 | do | .55 |

While the subject invention is employed in a circuit for attenuating the sound signal carrier of the signal channel adjacent that selected to be received, it may be used in any type of circuit for trapping or attenuating a signal of any given frequency.

Thus, the invention provides a new and improved inductive device for use in an interstage signal attenuating circuit. The inductive device provides adjustment of both its inductance to determine the trap frequency and the Q of the trap circuit in which it is included and yet is inexpensive to construct and utilizes a minimum number of components.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A signal translating trap network for use in a television receiver which receives a selected one of a plurality of transmitted television signals each having associated with it both sound and video components, said network comprising:
   - a capacitive device;
   - an inductance coil coupled to said capacitive device to resonate therewith and constitute a trap for signals corresponding in frequency to the resonant frequency of said trap;
   - a first tuning core supported in coaxial alignment with and movable longitudinally of said coil for tuning said trap to the sound component of the transmitted television signal adjacent said selected one of said transmitted television signals, said first core being constructed of a material which effects substantially equal proportional variations in the inductance and equivalent resistance of said coil to maintain the Q of said coil substantially constant with changes in coupling of said first core with the field of said coil;
   - and a second tuning core likewise supported in coaxial alignment with and movable longitudinally of said coil independently of said first core for varying the amount of attenuation of said trap, said second core being constructed of a material which predominantly effects variations in the Q of said coil with changes in coupling of said second core with the field of said coil.

2. An adjustable wave signal trap network for attenuating a wave signal of predetermined frequency comprising:
   - a capacitive device;
   - an inductance coil coupled to said capacitive device to resonate therewith and constitute a trap for signals of said predetermined frequency;
   - means, including a first tuning member supported in coaxial alignment with and movable longitudinally of said coil, for effecting substantially equal proportional variations in the inductance and the equivalent resistance of said coil to maintain the Q of said coil substantially constant with changes in coupling between said first member and the field of said coil, whereby the Q of said coil is substantially independent of the adjustment of said first tuning member;
   - and further means, including a second tuning member supported in coaxial alignment with and movable longitudinally of said coil independently of said first member, for predominantly effecting variations in the Q of said coil with changes in coupling between said second member and the field of said coil.

3. An adjustable trap network as defined by claim 2 in which said first and second tuning members comprise cores of different magnetic materials disposed within opposite extremities of said coil.

4. An adjustable trap network as defined by claim 3 in which the magnetic material of said second member has a higher power loss property than the magnetic material of said first tuning member.

5. A signal translating trap network for use in a television receiver which receives the sound and video components of a selected one of a plurality of transmitted television signals as well as the sound and video components of adjacent channel television signals, said network comprising:
   - a capacitive device;
   - an inductance coil coupled to said capacitive device to resonate therewith and constitute a trap for signals corresponding in frequency to the resonant frequency of said trap;
   - a first tuning core supported in coaxial alignment with and movable longitudinally of said coil for tuning said trap to one of said components of a transmitted television signal, said first core being constructed of a material which effects substantially equal proportional variations in the inductance and the equivalent resistance of said coil to maintain the Q of said coil substantially constant with changes in coupling of said first core with the field of said coil;
   - and a second tuning core also supported in coaxial alignment with and movable longitudinally of said coil independently of said first core for varying the amount of attenuation applied by said trap to said one component, said second core being constructed of a material which predominantly effects variations in the Q of said coil with changes in coupling of said second core with the field of said coil.

References Cited

UNITED STATES PATENTS

| | | | |
|---|---|---|---|
| 2,177,835 | 10/1939 | Mennerich | 333—78 |
| 2,180,113 | 10/1939 | Harvey | 333—78 |
| 2,213,328 | 9/1940 | Schafer | 333—78 |
| 2,340,749 | 2/1944 | Harvey | 336—136 |
| 2,597,237 | 5/1952 | Friend | 333—78 |
| 2,652,447 | 9/1953 | Crosby | 178—5.8 |
| 2,722,664 | 10/1955 | Duncan | 336—133 |
| 2,724,091 | 11/1955 | Klapperich | 336—136 |
| 2,728,052 | 12/1955 | Van Dyne | 333—78 |
| 2,953,756 | 10/1960 | Lafferty | 333—77 |

ELI LIEBERMAN, *Primary Examiner.*

DAVID G. REDINBAUGH, HERMAN KARL SAALBACH, *Examiners.*

CHARLES BARAFF, J. A. O'BRIEN, *Assistant Examiners.*